United States Patent [19]

Brown

[11] 4,185,823
[45] Jan. 29, 1980

[54] BICYCLE GAME DEVICE AND METHOD OF PLAYING GAMES THEREWITH

[75] Inventor: Bruce R. Brown, Welland, Canada

[73] Assignee: B & D Trailer Company Limited, Welland, Canada

[21] Appl. No.: 867,461

[22] Filed: Jan. 6, 1978

[51] Int. Cl.² .............................................. B62J 39/00
[52] U.S. Cl. .............................. 273/95 R; 280/289 R
[58] Field of Search ............ 273/95 R, 95 B; 46/1 H, 46/47, 77, 81, 86 R, 214; 280/289 R

[56] References Cited

U.S. PATENT DOCUMENTS

| | | | |
|---|---|---|---|
| 1,425,698 | 8/1922 | Sale | 46/214 |
| 2,287,133 | 6/1942 | Reiter | 46/214 X |
| 2,356,280 | 8/1944 | Smith | 46/214 |
| 2,512,421 | 6/1950 | Fay | 273/95 B |
| 2,581,201 | 1/1952 | Pettit | 46/214 |
| 3,210,889 | 10/1965 | Lyman | 280/289 R X |
| 3,380,756 | 4/1968 | Poynter | 280/289 R |
| 3,545,790 | 12/1970 | Davis et al. | 280/289 R |
| 3,982,771 | 9/1976 | Tropeano | 280/289 R |

Primary Examiner—Richard J. Apley
Attorney, Agent, or Firm—Stanley J. Rogers

[57] ABSTRACT

An apparatus for playing a bicycle game, and forming part of or attached to a bicycle or similar vehicle, can release a plug or similar object, so as to drop the plug at a target on the ground. Actuation for release of the plug is carried out by the rider. The apparatus also includes an indicator means such as a trailing line, for temporary detachment by a pursuer, and this action can also release the plug. The game can be carried out by a single rider and in games of pursuit by teams each comprising several riders.

5 Claims, 4 Drawing Figures

BICYCLE GAME DEVICE AND METHOD OF PLAYING GAMES THEREWITH

FIELD OF THE INVENTION

The present invention relates to recreational activities and apparatus for use therein. More particularly the invention relates to a recreational apparatus for attaching to or comprising part of a bicycle or similar vehicle for use in games of pursuit carried out by a team of players, and/or games involving the accurate placing, on a target location, of an object by release of the object from the moving vehicle. The invention also relates to the method of playing games with the bicycle equipped with the apparatus in accordance with the present invention.

DEFINITION OF THE INVENTION

The present invention has as an object the provision of a new game apparatus which can be attached to or forms part of a wheeled vehicle such as a bicycle and which apparatus is simple in design, and a method for playing games therewith.

In accordance with the present invention there is provided an apparatus forming part of or adapted for attachment to a wheeled vehicle such as a bicycle or similar vehicle, for use in recreational activities, said apparatus comprising:

a main carrier frame adapted for attachment to or forming part of a bicycle, said main carrier frame defining a confinement for an object and having a support member for releasably receiving an object, said support member being moveable between a first, object engaging position and a second, object releasing position; and actuating means for moving said support member from said first object engaging position to said second, object releasing position.

Also in accordance with the present invention there is provided a method of placing of an object on a predetermined target from a wheeled vehicle such as a bicycle equipped with an apparatus having:

a main carrier frame adapted for attachment to or forming part of a bicycle, said main carrier frame defining a confinement for an object and having a support member for releasably receiving an object, said support member being moveable between a first, object engaging position and a second, object releasing position; and actuating means for moving said support member from said first object engaging position to said second, object releasing position;

said method comprising:

loading said main carrier frame with an object;

approaching a given target location of a size approximating an area the area of the object to be released from the bicycle; and actuating the actuation means for release of the object from the main carrier frame.

DESCRIPTION OF THE PREFERRED EMBODIMENTS

Figures 1, 2, 3:
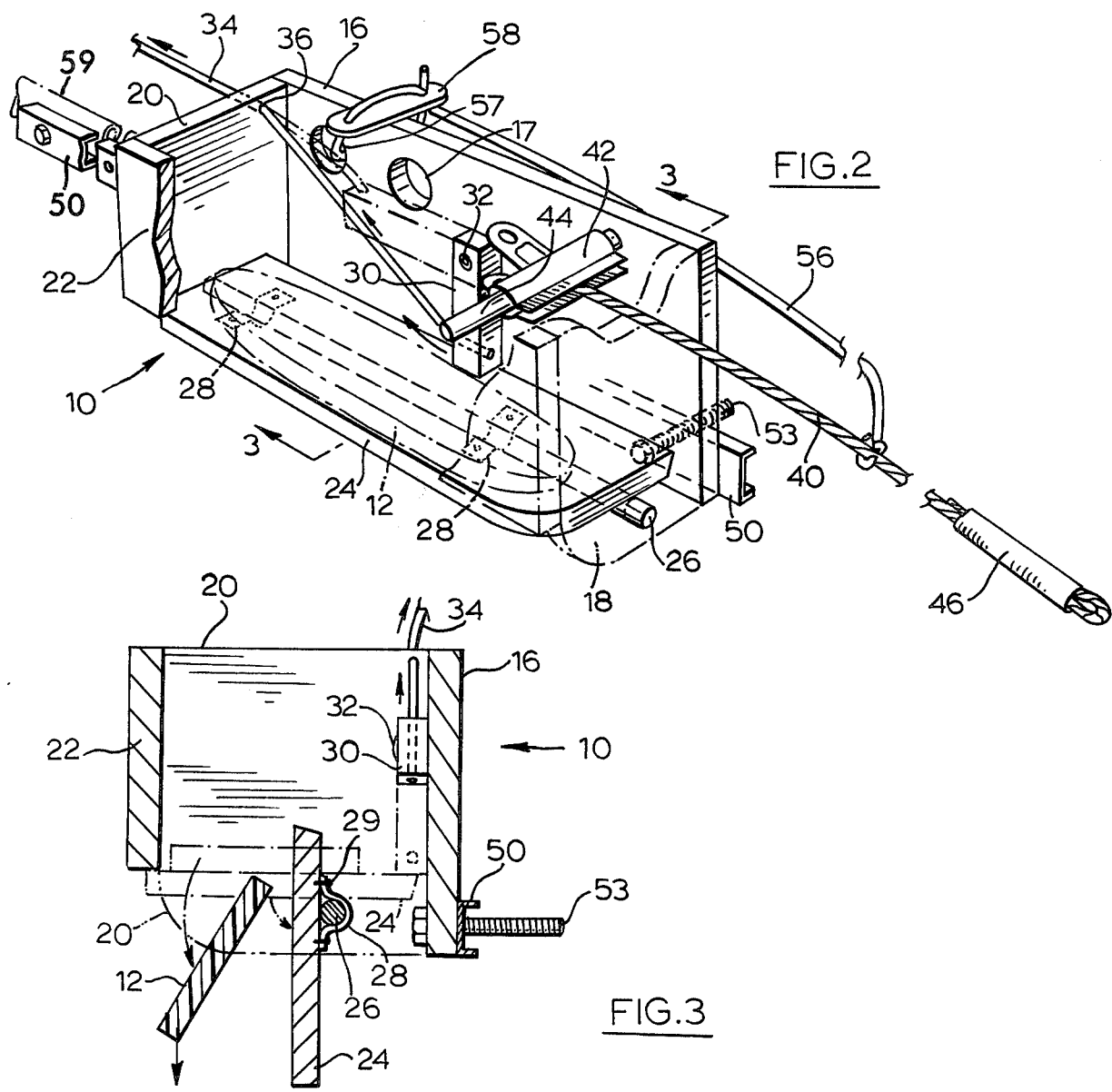
FIG. 1 shows two cyclists riding bicycles each of which is fitted with the apparatus according to the present invention, showing the trailing line.
FIG. 2 is a perspective view of the apparatus is accordance with the present invention with the object retained in the object engaging position.
FIG. 3 is a cross-sectional view along line 3—3 in FIG. 2, showing the object being released from the bicycle.

As can best be seen with reference to FIGS. 1 and 2, a main carrier frame 10 is provided which can hold a plug or plug-like object 12. The main carrier frame 10 is attached to a bicycle, generally designated 14. The dimensions of the main carrier frame 10 are selected such that a plug or plug-like object 12 can be retained in the main carrier frame and released therefrom as described below.

The main carrier frame 10 comprises a back member 16 of generally rectangular configuration, provided with an attachment hole 17 by means of which the carrier frame 10 can be attached to the bicycle 14, by bolts or clamps, not shown. The main carrier frame 10 further comprises a following end member 18, a leading end member 20 and a front member 22 as can best be seen with reference to FIGS. 2 and 3.

Movably disposed in the lowermost opening of the main carrier frame 10 is a bottom plate 24. The bottom plate 24 can move from a first, object engaging position to a second, object releasing position by turning counterclockwise, about a shaft 26. In order to turn about shaft 26, the bottom plate 24 has on its lowermost face, a pair of brackets 28 receiving the shaft 26, which brackets 28 are fastened to the plate 24 by rivets 29 or similar fasteners. The ends of the shaft 26 are fixedly mounted in end members 18 and 20 of the frame. The bottom plate 24 is mounted off-center on the shaft 26 when viewed in plan view, thus dividing the plate into a narrower side and a wider side; the lateral edge of the narrower side is undercut or bevelled as can best be seen in FIG. 3.

As can also best be seen with reference to FIG. 3, the front member 22 is of slightly lesser height than the corresponding back member 16. Therefore, in the object engaging position of the bottom plate 24, the upper surface of the bottom plate 24 contacts the lowermost, longitudinal edge of the front member 22. To move the bottom plate 24 from its plug engaging position to its plug releasing position, an actuating means is provided, consisting essentially of a lock bar 30 and a line 34 connected thereto. The lock bar 30 retains the bottom plate 24 in the object engaging position by having the upper face of the narrower side of the bottom plate 24 rest against the lowermost edge of lock bar 30. Lock bar 30 is mounted on the face of back member 16 at the approximate centre of the length thereof inside of the main carrier frame 10. The lock bar 30 can pivot about a pivot pin 32 which pin extends through lock bar 30 into the back member 16. This pin 32 can be a screw or similar fastener which will permit turning of the lock bar 30 in clockwise and counterclockwise direction.

The line 34 forming part of the actuating means extends from the lower end of lock bar 30 through a hole 36 in leading end member 20 for actuation by trigger means near the bicycle handle of the bicycle 14, not shown in detail. On actuation of the line 34, the lock bar 30 is displaced, by turning about the pivot pin 32, in clockwise direction. The displacement position of the lock bar 30, corresponding to the object releasing position of the bottom plate 24, is shown in broken lines in FIG. 2. Thus, as the lock bar 30 is actuated by line 34, the bottom plate 24 is free to tilt, due to gravity, via the brackets 28, about the tilt centre provided by shaft 26. When an object is carried on the bottom plate 24, as illustrated by the plug 12, the plug 12 is released from the confinement of the main carrier frame 10 and drops to ground level. On returning the bottom plate 24 to its respective object engaging position as indicated in phantom lines in FIG. 3, the lock bar 30 can be returned to the locking position by moving it counterclockwise with respect to pivot pin 32. This is effected manually, as another plug 12 is mounted in the frame 10.

In order to adapt the device described for playing a game of pursuit, an indicating means such as a trailing line 40 is provided which extends from a clamp 42 through a generally U-shaped depression in the following end member 18 towards ground level. The clamp 42 is held on a shaft 44 which is secured, respectively, in the walls of back member 16 and front member 22, as can best be seen with reference to FIG. 2. The free or trailing end of trailing line 40 is provided with a hollow sleeve 46 into which the free end is inserted after bending or folding of a desired length of the free end by 180°, for adjustment of the total length of the free or trailing end of trailing line 40 that will be trailing on ground level.

The total detachment of the trailing line 40 from the main frame 10, when clamp 42 releases the end of line 40, is prevented by an anchor line 56, one end of which is fixedly interconnected with the trailing line 40 as best shown in FIG. 2. The other end of the anchor line 56 is wound through two holes of a retainer bar 58 and a hole 57 in the back wall 16 of the main frame 10. Thus, as the trailing line 40 is released from clamp 42, it will be free to move for a given distance and its movement will then be terminated by the anchor line 56 secured, via retainer bar 58, to the main carrier frame 10 and thereby to the bicycle 14.

In order to secure the apparatus to bicycle 14, a channel member 50 is provided at the lower, outer edge of the back member 16. The channel member 50 is attached with its back to the outside face of the back member 16 by screws or similar fasteners, not shown. The channel member 50 extends forwardly with respect to the bicycle 14 as best shown in FIG. 2. The toes of the channel member 50, pointing away from the main carrier frame 10, come to rest on the oval section, horizontal member 59 of the bicycle frame, to which the assembly can be clamped with clamps, or by lacing with tape, string or similar fastening means, not shown in detail.

To prevent shifting of the main carrier frame 10, a further screw 53 is provided which extends through an aperture in the bicycle frame as is generally indicated in FIG. 2. In addition aperture 57 is provided to further secure the apparatus to the vehicle frame by means of clamps or the like, not shown in detail.

The playing of a game with the apparatus thus far described can be carried out in the following various modes:

In an individually executed game of manoeuvering and position timing, while bicycle riding, the object 12 is released from the main carrier frame 10 by actuation of line 34 through trigger means, in the vicinity of the bicycle handlebars, not shown in detail, by the rider of bicycle 14. Actuation of line 34 will displace lock bar 30 and, thus, when the object 12 is contained in the main carrier frame 10, the bottom plate 24 will tilt or move to its object releasing position due to gravity, about shaft 26 as shown in FIG. 3. The object 12 will be dropped from the bicycle and, depending on the accuracy of the aim of the rider can land with precision on a predetermined target area or goal corresponding in size approximately to the total area of the object that is released from the bicycle.

In a game carried out by a team of players, all riding bicycles, the players are incapacitated, in accordance with the rules of the game, when the trailing line 40 is released from the clamp 42. This can be accomplished by a bicycle rider of the opposing team, who rides his bicycle over the trailing end of line 40 on the ground with the object of causing this tripping of an opponent's trailing line 40. Such incapacitation can also occur accidentally, as a result of a mistake by a teammate. The tripping of a trailing line is clearly visible to a non-participant such as a referee.

Figure 4:
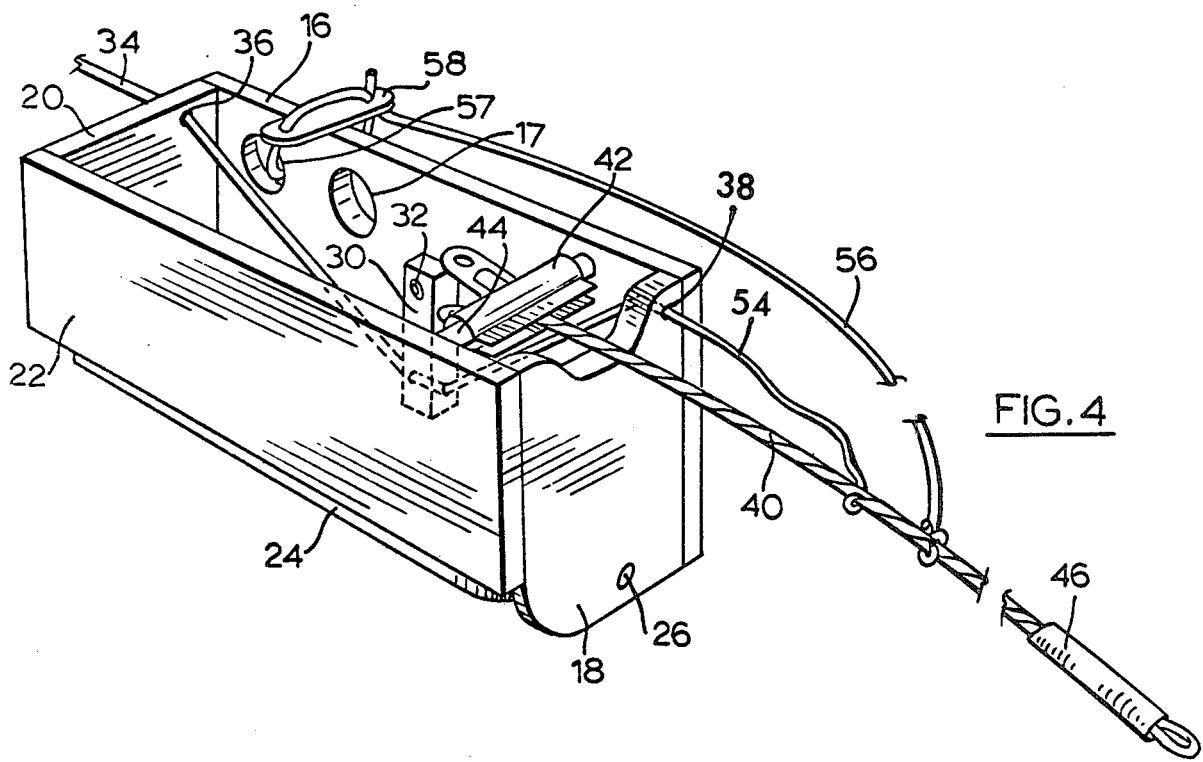
FIG. 4 is a view of a further embodiment of an apparatus according to the present invention.

A modification of the embodiment thus far described, is shown in FIG. 4. In this embodiment the lock bar 30 is actuated by actuation of the trailing line 40. To be actuated by trailing line 40, one end of a second actuating line 54 is attached to the lowermost end of the lock bar 30. The line 54 extends through an opening 38 in the following end member 18 of main carrier frame 10 and its other end is then attached at a given distance to the trailing line 40. Tripping for a sufficient period of time of trailing line 40, will actuate, via second actuating line 54, the lock bar 30, which moves counterclockwise and the bottom plate 24 assumes the object releasing position. The effective length of line 54 is selected such that the indicating means, as provided by trailing line 40, is detached prior to actuation of the lock bar 30 to permit movement of the bottom plate 24 to its object releasing position.

Thus, in a modification of the team game described earlier, the player carrying a plug 12 can be deprived of his opportunity to drop the plug on the target area when other players in the game detach the trailing line 40 of his bicycle and return of the plug 12 from main carrier frame 10.

It will be appreciated that other modifications can be made to the embodiments thus far described. Thus, the main carrier frame 10 can be of unitary construction and can have a configuration that is of another shape than strictly rectangular; the bottom plate 24 can be actuated to slide or otherwise assume an object releasing position. Also, other indicating means can be provided to indicate that a player is inactive in the game, and, also different arrangements are possible for attaching the tail and anchor line to the bicycle. The actuation in the main carrier frame 10 to release the object therefrom could be from the handlebar of the bicycle 14 or from any other location that can conveniently be reached by the rider of the bicycle. The fastening of the main carrier frame can be modified to suit a sports bicycle, touring bicycle or similar wheeled vehicle.

I claim:

1. Apparatus forming part of or adapted for attachment to a wheeled vehicle such as a bicycle or similar vehicle, for use in recreational activities, said apparatus comprising:
    a main carrier frame adapted to or forming part of a bicycle, said main carrier frame defining a confinement for an object and having;
    a support member for releasably receiving an object, said support member being movable between a first, object engaging position and a second, object releasing position; and actuating means for moving said support member from said first object engaging position to said second, object releasing position, said support member being movably arranged with respect to the underside of the main carrier, and said actuating means including a lock bar adapted to engage and retain the support member and its first, object engaging position, and at least one actuating line attached to the lock bar and adapted to move the lock bar out of engagement with the support member to allow movement of the support to its second, object releasing position, and wherein said support member comprises a generally flat plate pivotally mounted on an off-centre shaft to said main frame, said shaft effectively dividing the plate into a major area portion and a minor area portion, the lock bar in the first, object engaging position engaging the upper surface of the major area portion of said plate to retain the plate in substantially horizontal disposition, the lock bar in the second, object releasing position being moved clear of the plate so as to allow gravity tilting of the plate about said shaft to assume its second, object releasing position.

2. Apparatus according to claim 1 wherein the actuating line is actuatable by trigger means in the vicinity of the bicycle handlebars.

3. Apparatus according to claim 1 further including indicator means, said indicator means comprising a rearwardly extending trailing line releasably clamped to said main frame.

4. Apparatus in accordance with claim 3, further comprising:

an anchor line fixedly attached with one end to said trailing line and with its other end to said carrier frame.

5. The apparatus in accordance with claim 4, further comprising:

a sleeve for adjusting the lengths of line trailing on ground level.

* * * * *